US 8,141,517 B2

(12) United States Patent
Shimoda et al.

(10) Patent No.: US 8,141,517 B2
(45) Date of Patent: Mar. 27, 2012

(54) EXPANDABLE PET PEN

(75) Inventors: Naoki Shimoda, Toyama (JP); Ryosuke Fujii, Toyama (JP)

(73) Assignee: Richell U.S.A., Inc., Grand Prairie, TX (US)

( * ) Notice: Subject to any disclaimer, the term of this patent is extended or adjusted under 35 U.S.C. 154(b) by 647 days.

(21) Appl. No.: 11/939,362

(22) Filed: Nov. 13, 2007

(65) Prior Publication Data

US 2008/0110412 A1 May 15, 2008

(30) Foreign Application Priority Data

Nov. 13, 2006 (JP) ................................. 2006-307015

(51) Int. Cl.
*A01K 1/03* (2006.01)
(52) U.S. Cl. ........ 119/473; 119/474; 119/498; 119/512; 119/513; 119/481
(58) Field of Classification Search .................. 119/513, 119/473, 472, 474, 502, 507, 512, 516, 519, 119/522; 256/25, 24, 73; 5/100
See application file for complete search history.

(56) References Cited

U.S. PATENT DOCUMENTS

| | | | | |
|---|---|---|---|---|
| 2,491,577 A * | 12/1949 | Olinger | ............................ | 256/25 |
| 2,610,830 A * | 9/1952 | Beatty | ............................ | 256/27 |
| 3,064,305 A | 11/1962 | Hill | | |
| RE28,834 E * | 6/1976 | Johnson | ........................ | 119/529 |
| 5,016,772 A * | 5/1991 | Wilk | ................................. | 220/8 |
| 5,081,723 A * | 1/1992 | Saunders | ........................ | 5/100 |
| 5,353,743 A * | 10/1994 | Walton | ........................... | 119/166 |
| 5,469,807 A * | 11/1995 | Kosmaczeska | ............... | 119/484 |
| 5,671,697 A * | 9/1997 | Rutman | ........................ | 119/473 |
| 5,950,566 A * | 9/1999 | Ricketts | ........................ | 119/473 |
| 6,230,655 B1 * | 5/2001 | Cohen et al. | .................. | 119/459 |
| 6,832,580 B2 * | 12/2004 | Marchioro | ..................... | 119/452 |
| 6,883,463 B2 * | 4/2005 | Link | ................................ | 119/474 |
| 7,316,203 B2 * | 1/2008 | Marchioro | ..................... | 119/474 |
| 7,487,744 B1 * | 2/2009 | Goldberg et al. | ............... | 119/453 |
| 7,568,449 B2 * | 8/2009 | Hirokawa et al. | .............. | 119/452 |
| 2004/0031446 A1 * | 2/2004 | Harrison | ........................ | 119/480 |

FOREIGN PATENT DOCUMENTS

| | | |
|---|---|---|
| JP | 3098127 | 2/2004 |
| JP | 2006271215 | 12/2006 |
| JP | 2008118931 A | 5/2008 |

* cited by examiner

*Primary Examiner* — Son T Nguyen
(74) *Attorney, Agent, or Firm* — Conley Rose, P.C.

(57) ABSTRACT

A pet pen for housing a pet is provided. The pet pen comprises a plurality of enclosing members with each enclosing member having a wall body and an opening end. The enclosing members form the pen by overlapping a portion of the wall body at two or more of the opening ends, and the pen width can be adjusted by adjusting the length of the overlapping portion. The pen width can be adjusted without removing an enclosing member.

4 Claims, 21 Drawing Sheets

(a)　　　　　　(b)

EXPANDABLE PET PEN

CROSS-REFERENCE TO RELATED APPLICATIONS

This application claims priority to Patent Application Serial No. JP2006-307015, entitled "Expandable Pet Pen", filed with the Japan Patent Office on Nov. 13, 2006, under the Paris Convention for the Protection of Industrial Property.

STATEMENT REGARDING FEDERALLY SPONSORED RESEARCH OR DEVELOPMENT

Not applicable.

REFERENCE TO A MICROFICHE APPENDIX

Not applicable.

FIELD OF THE DISCLOSURE

This disclosure relates to a pet pen used for keeping a pet and to a panel body used to form the pen.

BACKGROUND OF THE DISCLOSURE

A pet pen can be described as an enclosure for keeping a pet. An example of a pet pen in which a plurality of panel bodies are put together to form an enclosure is disclosed in Japanese Publication No. 2006-271215.

In addition, although not a pet pen, Japanese Patent No. 3098127 discloses a pet cage in which the housing space can be changed in accordance with the type and size of the pet.

The pet cage of Japanese Patent No. 3098127 has a bottom frame that is positioned at the bottom of the housing space. One or more of a middle frame are positioned in the middle of the housing space, and a top frame is provided at the top of the housing space. A support column is provided so as to be removable from the bottom frame, the middle frame, and the top frame. In the case where the middle frame is arranged between the bottom frame and the top frame, linear plates, which are installed so as to be removable between the middle frame and bottom frame or between the middle frame and the top frame and partition the housing space area, are combined with the frames and have one level or multiple levels.

SUMMARY OF THE DISCLOSURE

In an embodiment of the disclosure, a pet pen for housing a pet is provided. The pet pen comprises a plurality of enclosing members with each enclosing member having a wall body and an opening end. The enclosing members form the pen by overlapping a portion of the wall body at two or more of the opening ends, and the pen width can be adjusted by adjusting the length of the overlapping portion. The pen width can be adjusted without removing an enclosing member.

In another embodiment of the disclosure, a pet pen for housing a pet is provided. The pet pen comprises a plurality of enclosing members with each enclosing member having a wall body. The pet pen further comprises a door provided in a portion of the wall body of an enclosing member, and a lock mechanism which is installed on the door. The lock mechanism functions as a lock when the door is in a closed state, and when the door is in an open state, the lock mechanism also functions to maintain the open state. The pen is formed to be adjustable in the width direction without removing an enclosing member.

In yet another embodiment of the disclosure, a pet pen for housing a pet is provided. The pen is formed to be adjustable in the width direction, and a pen tray to be installed under the pen. The pen and the pen tray expand and contract in the width direction at a prescribed increment, and width direction adjustment increment for the pen and the pen tray are set at the same increment.

In a further embodiment of the disclosure, a panel for enclosing a pet is provided. The panel comprises a first panel body having a wall body with a door provided in a portion of the wall body. The panel further comprises a second panel body having a wall body that is arranged to overlap a portion of the first panel body. The width of the entire panel body can be adjusted by adjusting the amount of overlap of the first panel body and the second panel body. By making a portion of the wall body of the second panel body movable, the door function is not obstructed even in the case where the door overlaps with the wall body of the second panel body.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION OF THE PREFERRED EMBODIMENTS

Figure 1:
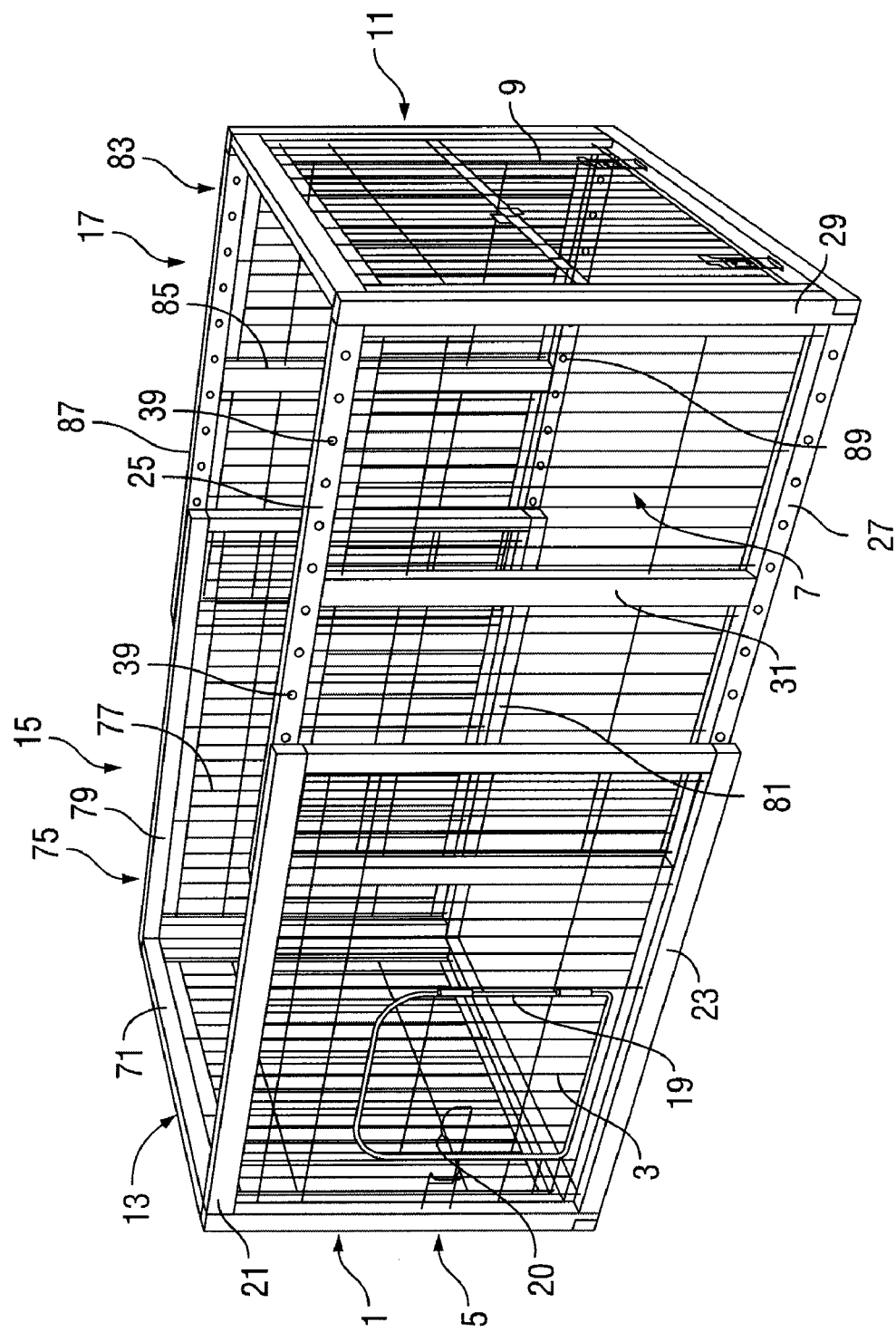
FIG. 1 is a perspective view of the pet pen of an embodiment of the disclosure.

A pet, such as a dog, is usually kept from the time that it is a puppy of about 2-3 months old. However, growth of the puppy is fast, and the pen that was suitable when the puppy was young soon becomes too small. Installing a large pen from the start may not be preferable due to the room space in the case where the pet is kept indoors for example. Therefore, when a person is selecting from pet pens having a fixed size, that person is faced with one of two options. The first option is to select a pen that is suitable for the current size of the pet. By selecting a pen that is suitable for the current size of the pet, the space taken up by the pen is minimized. However, the expense of replacing the pen with a larger one as the pet grows will be incurred. The second option is to select a pen that will accommodate the size of the pet when it is full grown. This option has the benefit of not requiring the replacement of the pen as the pet grows. However, while the pet is growing, the pen will occupy more space than necessary.

Therefore, when a pet pen is being selected, consideration must be given to both the growth of the pet as well as the space occupied by the pen. However, pet pens, like the one disclosed in Japanese Publication No. 2006-271215, have a fixed size, which means that either space is sacrificed or additional pens will be required.

While it is possible to change the size of the pet cage disclosed in Japanese Patent No. 3098127, the size of the housing space is changed by joining the frames comprising support columns and linear plates having a fixed length. For this reason, the extent to which change is possible is based on the length of the support columns. Therefore, small adjustments are not possible. Also, in order to change the size, operations such as the mounting of support columns are necessary. Thus, changing the size is not easy.

With these challenges in mind, the present disclosure relates to a pet pen in which the housing space can be changed easily and continuously.

In a first embodiment, the pet pen of the present disclosure is formed to be adjustable in the width direction. The width direction refers to the horizontal directions which exclude the height direction and may, for example, include the depth direction of the pen. The adjustment is said to be in the width direction because the adjustment is referenced from a frontal view. However, if the adjustment was viewed from the side, the adjustment could be said to be in the depth direction of the pen. Although the present disclosure refers primarily to adjustment in the width direction, it is understood that both the width and the depth directions are included and that whether the adjustment is in the width or the depth direction is a matter of perspective.

In a second embodiment, a plurality of enclosing members, which have opening ends, form a pen by overlapping a portion of the wall body of the opening ends, and the pen width can be adjusted by adjusting the length of the overlapping portion.

The wall body refers to the enclosing walls comprising the enclosure. Various forms of a wall body include a fence-shaped wall body formed of a linear members and a fence-shaped wall body formed of a plate-like material.

A pen refers to an enclosure with a closed periphery.

The form of the pens in the case where there are two enclosures is such that in the planar view, the opening of the U in the pair of U-shaped enclosures are arranged so as to oppose each other.

The form of the pens in the case where there are four enclosures is such that in the planar view, one portion of the adjacent wall body of the enclosure in the four substantially V-shaped enclosures overlaps to form a pen.

In a third embodiment, the pen can be adjusted in both the width direction and the depth direction.

In a fourth embodiment, a door is provided in one or a plurality of the wall bodies of the enclosing members, and in the case where the wall body of an enclosing member that does not have the door overlaps with the door portion, the overlapping member forming the wall body can be moved.

Moving includes removing the overlapping member, sliding, folding, rotating the overlapping member, withdrawing the overlapping member in the rear direction, and the like. That it is to say, moving includes various forms for preventing the door from being obstructed when it is opened.

In a fifth embodiment, a door is provided in a portion of the wall body forming the pen, and a lock mechanism is installed on the door. The lock mechanism functions as a lock when the door is closed, and when the door is in an open state, the lock mechanism also functions as a lock mechanism to maintain the open state.

In a sixth embodiment, the lock mechanism comprises a first anchor portion which anchors the door in a closed state to the frame of the pen and a second anchor portion which anchors the door in an open state to the frame or wall member of the pen. When the door is closed, the first anchor portion is anchored to the frame and functions as a lock mechanism. When the door is open, the second anchor portion is anchored to the frame or wall member of the pen with the door in the open state and functions as an open door lock mechanism that keeps the door open.

In a seventh embodiment, a pen tray is installed under the pen, such that the pen tray can expand and contract in the width direction.

In an eighth embodiment, the pen and the pen tray can expand and contract and are adjustable in the width direction at prescribed increments, and width direction adjustment increment for the pen and the pen tray are set at the same increment.

In a ninth embodiment, the pen tray is formed of a plurality of plate materials that have uneven portions and a portion of the plurality of plate materials are overlapped to fit into the uneven portions and are connected to one another.

In a tenth embodiment, a panel body used as a pet pen or as a pet entry barring fence is provided. The panel body comprising a first panel body that includes a door and a second panel body that is arranged so as to overlap a portion of the first panel body. Therefore, by adjusting the amount of overlap of the first panel body and the second panel body, the width of the entire panel body can be adjusted, and by making a portion of the wall body of the second panel body removable, the door is not obstructed even in the case where the door overlaps with the wall body of the second panel body.

In the pet pen of the present disclosure, the pen width can expand and contract, and thus, the housing space can be changed easily and continuously in accordance with the growth of the pet.

Figure 2:
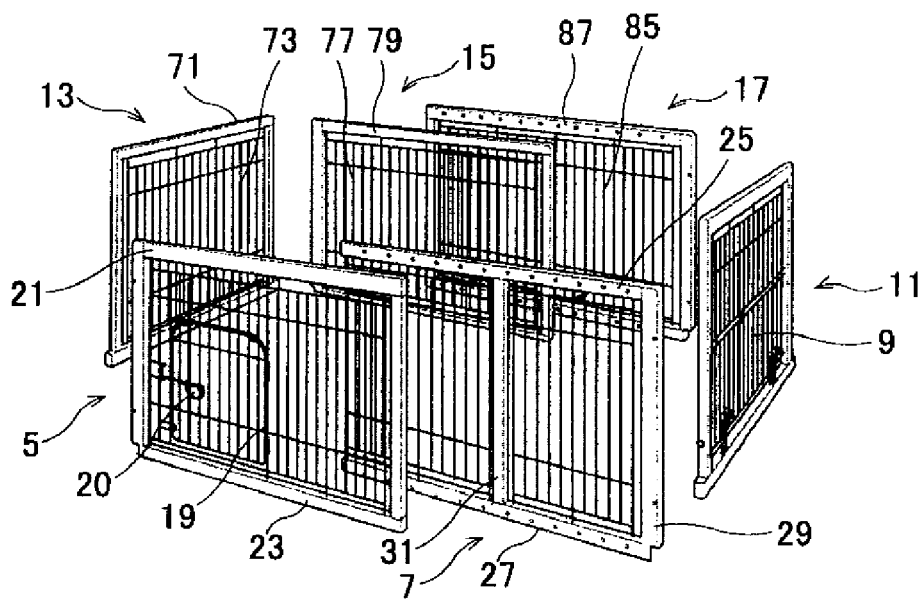
FIG. 2 is an exploded perspective view of the pet pen of an embodiment of the disclosure.

FIG. 1 is a perspective view of the pet pen of an embodiment of the present disclosure, while FIG. 2 is an exploded perspective view of the pet pen of an embodiment of the present disclosure.

As shown in FIG. 1 and FIG. 2, the pet pen has a first front panel 5 that includes a first door 3 that is the entrance for the pet. The pen also has a second front panel 7 that is arranged such that a portion of the second front panel 7 overlaps with the first front panel 5 at the rear side of the first front panel 5. The pen also has a right side panel 11 that includes a second door 9 for taking out and putting in a toilet and the like. The pen also has a left side panel 13, a first rear panel 15 that is disposed at the rear of the first front panel 5, and a second rear panel 17 that is disposed such that a portion overlaps with the rear of the first rear panel 15.

The following is a detailed description of the component members in one embodiment of the present disclosure.

First Front Panel

The first front panel 5 is formed by installing linear members on a rectangular wood frame. A first door 3 is formed from linear members on the left side of the panel. The first door 3 is rotated to the front with the right side vertical piece 19 as the rotational axis. A lock 20, which locks the first door 3 in the closed status, is installed on the left side of the first door 3.

The back surface side of the frame upper piece members 21 and the frame lower piece members 23 form the first front panel 5 and have connection holes (see FIG. 16) for connecting and fixing with the second front panel 7.

Second Front Panel

Figure 3:
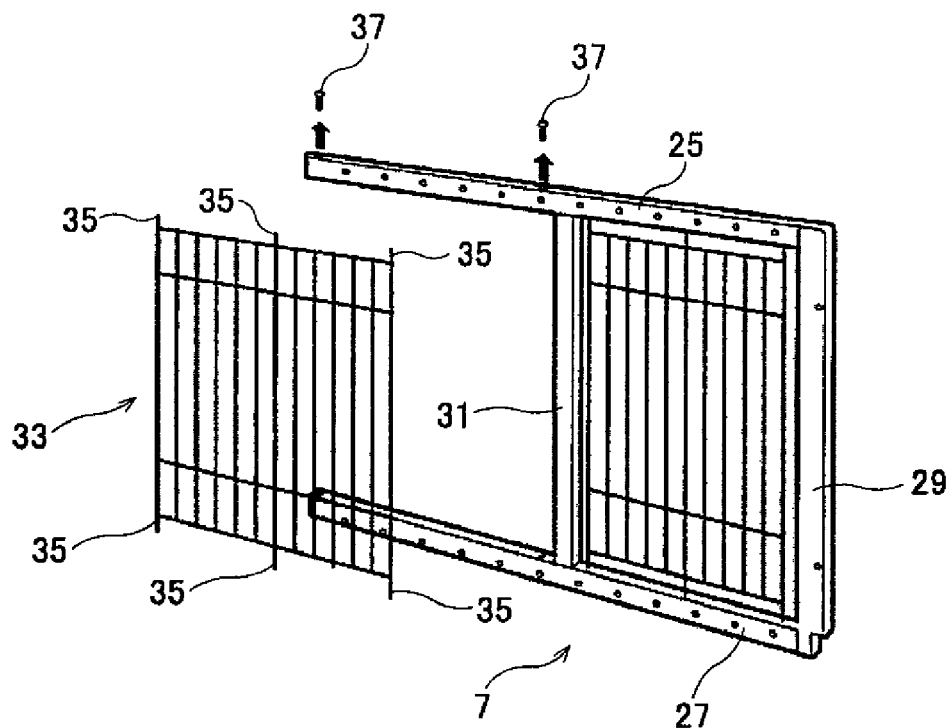
FIG. 3 is an explanatory diagram of the second front panel forming the pet pen of an embodiment of the disclosure.

As shown in FIG. 2, the second front panel 7 has a frame body that includes a frame upper piece member 25, a frame lower piece member 27, and a frame end vertical piece member 29 that connects the frame upper piece member 25 with the right end of the frame lower piece member 27. A frame middle vertical piece member 31 connects the frame upper piece member 25 vertically with the middle portion of the frame lower piece member 27 and the linear members inside the frame. In addition, as shown in FIG. 3, the fence body 33 comprising linear members on the left side of the frame middle vertical piece member 31 is detachable. That is to say, as shown in FIG. 3, the periphery of the fence body 33 is formed in a rectangular shape, and three leg portions 35 extend to the top and bottom pieces respectively. The leg portion 35 can be inserted into the frame. The upper sides of both ends of the leg portion 35 are fixed with the fixing screws 37, and the fixing screws 37 are taken off when the fence body 33 is to be removed.

The frame upper and lower piece members 25 and 27 have a plurality of connection holes 39 for connecting with the first front panel 5 at a prescribed increment.

Right Side Panel

Figure 4:
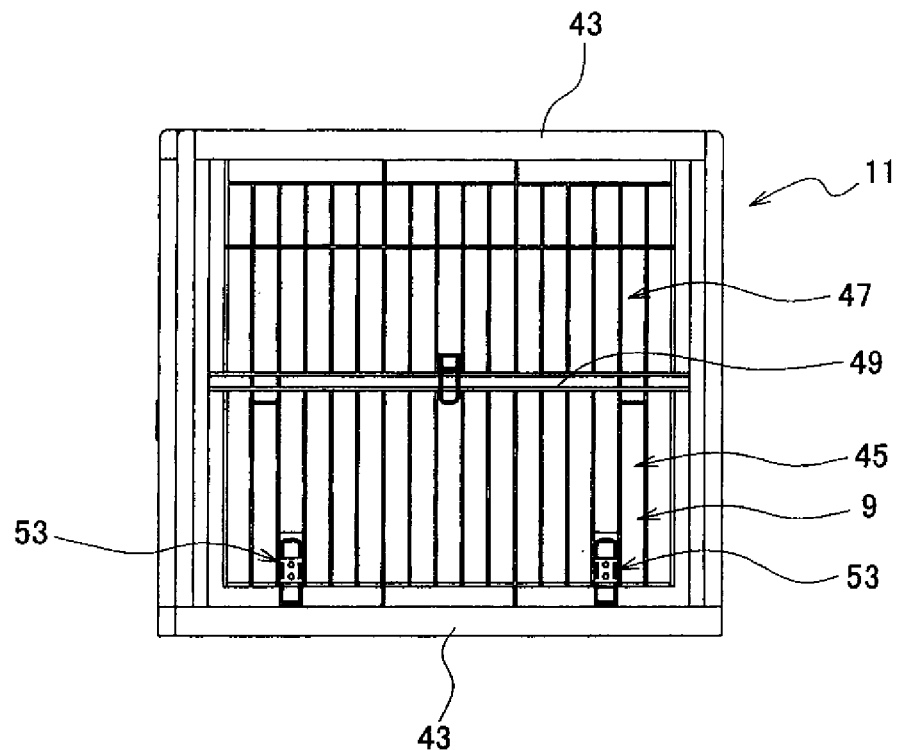
FIG. 4 is an explanatory diagram of the right side panel forming the pet pen of an embodiment of the disclosure.

As shown in FIG. 4, the right side panel 11 is formed by installing linear members into the frame of the rectangular frame body 43. The fence body is divided into upper and lower sections. The lower fence body 45 rotates with the upper piece 49 as the rotational axis, and the lower half that is inside the frame becomes the second door 9, which opens and closes. There is a lock member 53 at the left and right positions on the lower piece of the second door 9.

Figure 5:
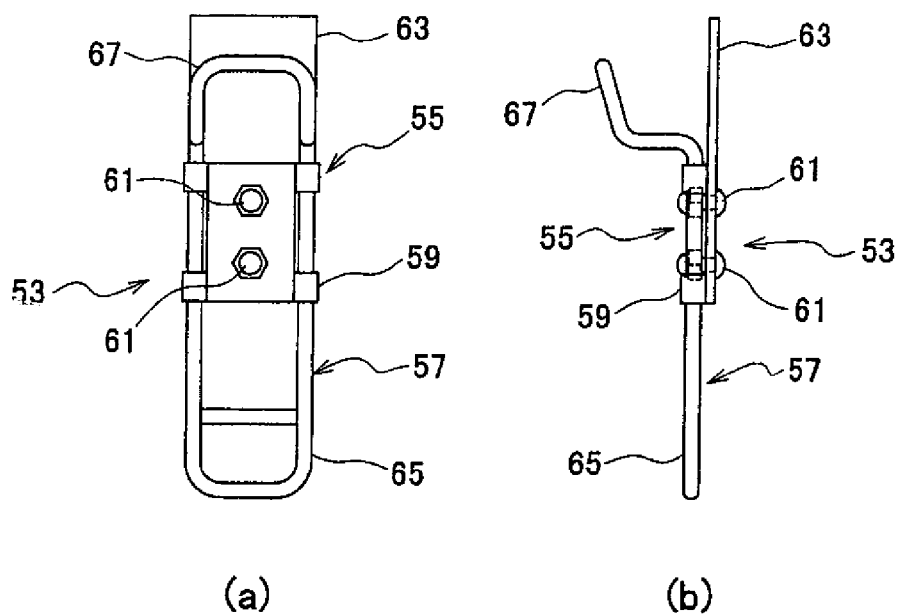
FIG. 5 is an explanatory diagram of a lock member installed on the right side panel shown in FIG. 4.

FIG. 5 is an explanatory diagram of the lock member 53. FIG. 5(a) is a front view while FIG. 5(b) is a side view. The lock member 53 comprises a main body portion 55 and a slide member 57 that is held so as to be slidable on the main body portion 55. The main body portion 55 comprises a holding portion 59 for holding the slide member 57 and a fixing portion 63 to be connected to the holding portion 59 with screws 61 and welded to the fence body. The slide member 57 comprises an insertion piece 65 and a hook piece 67 formed by bending the thick linear member into a rectangular ring shape.

When the second door 9 is to be closed, the slide member 57 is slid downwards, and the insertion piece 65 is inserted into a lock hole 69 that is provided in the lower piece member of the rectangular frame body 43. As a result, rotation of the second door 9 is restricted.

When the second door 9 is to be opened, the hook piece 67 is hooked to a linear member of the upper fence body 47, and the open state of the second door 9 is thereby maintained.

Figure 6:
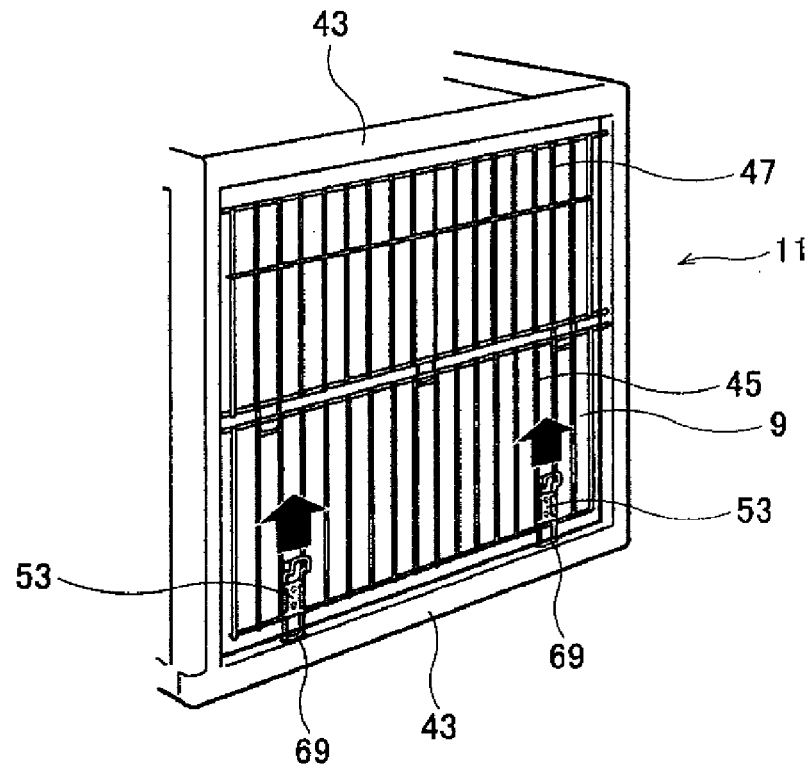
FIG. 6 is an explanatory diagram of the operation of the right side panel forming the pet pen of an embodiment of the disclosure.
Figure 7:
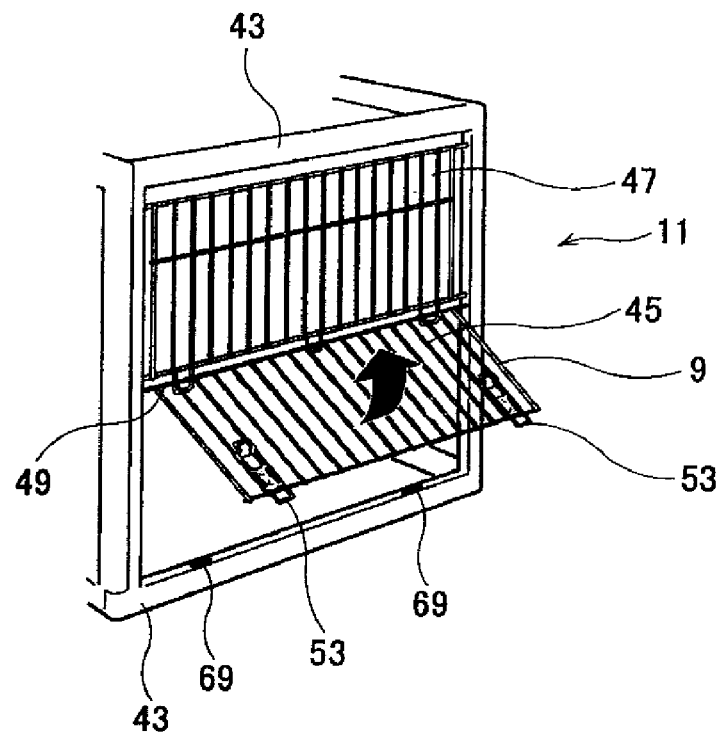
FIG. 7 is an explanatory diagram of the operation of the right side panel forming the pet pen of an embodiment of the disclosure.
Figure 8:
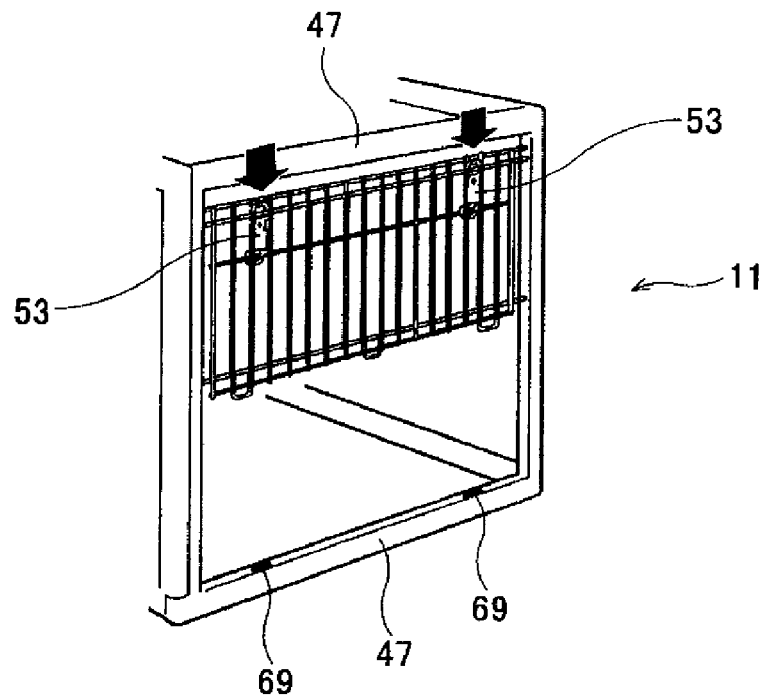
FIG. 8 is an explanatory diagram of the operation of the right side panel forming the pet pen of an embodiment of the disclosure.
Figure 9:
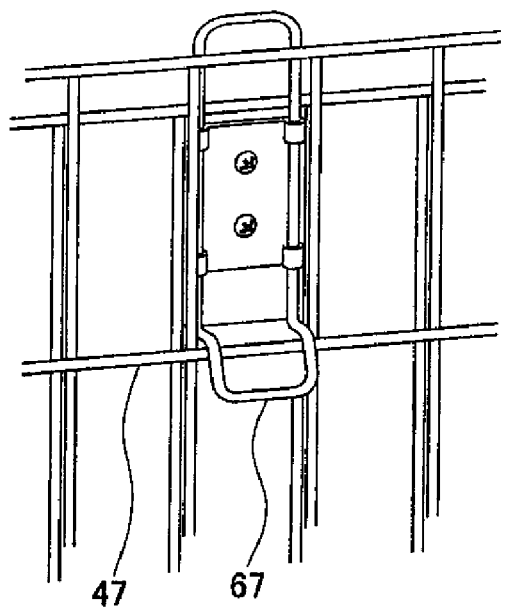
FIG. 9 is an explanatory diagram of the operation of the lock member shown in FIG. 5.

FIG. 6-FIG. 8 are explanatory drawings of the operation for opening the second door 9. As shown in FIG. 6, when the door is opened, the slide member 57 is pulled upward, and the insertion piece 65 is taken out from the lock hole 69. In this state, as shown in FIG. 7, by pulling up the second door 9 towards the front side, the second door 9 is rotated with the upper piece 49 as the rotational axis to open the door. In addition, as shown in FIG. 8, the second door 9 is caused to overlap with the upper fence body 47, and the slide member 57 is pushed downward. As a result, as shown in FIG. 9, the hook piece 67 of the slide member 57 is anchored by the horizontal member of the upper fence body 47, and rotation of the second door 9 is restricted. In this manner, the lock member 53 functions to lock the opening of the second door 9 when the second door 9 is closed, and when the second door 9 is opened, it holds the second door 9 in the open state.

It is noted that FIG. 9 shows the state where the right side panel 11 is viewed from the inside of the pen.

Left Side Panel

The left side panel 13 is formed by installing a fence body 73 comprised of linear members into the frame of the rectangular frame body 71. The left side panel 13 does not have a door such as that provided in the right side panel 11, but the right side panel 11 and the left side panel 13 can be interchanged.

First Rear Panel

The first rear panel 15 is formed by installing a fence body 77 comprised of linear members into the frame of the rectangular frame body 75. Connection holes for panel connection are formed at the outside of the frame upper piece member 79 and the frame lower piece member 81 that form the rectangular frame body 75.

Second Rear Panel

Like the first rear panel 15, the second rear panel 17 is formed by installing a fence body 85 comprised of linear members into the frame of the rectangular frame body 83. Multiple connection holes for connecting the panel to the first rear panel 15 are provided on the frame upper piece member 87 and the frame lower piece member 89 that form the rectangular frame body 83 of the second rear panel 17.

Figure 10:
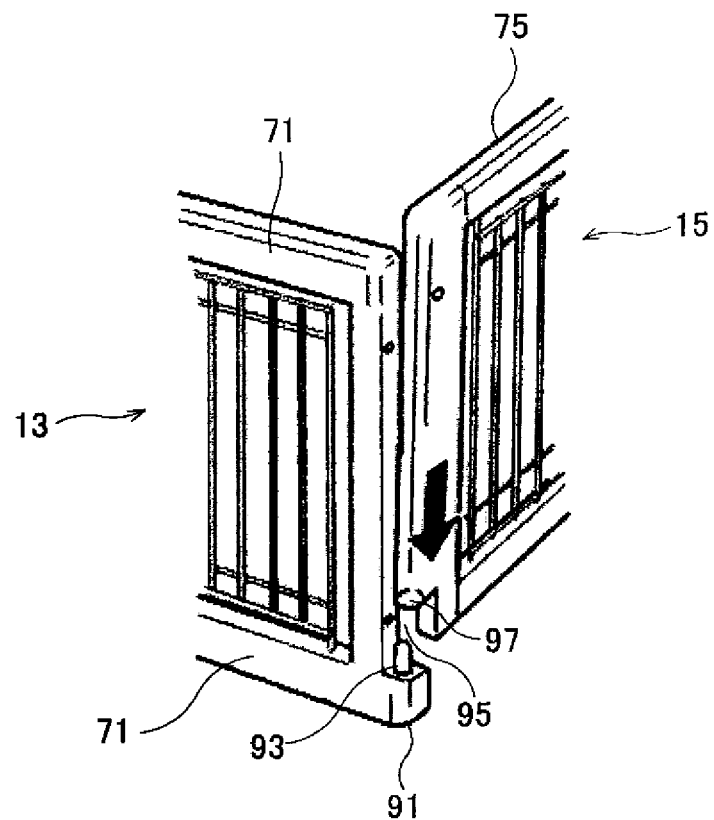
FIG. 10 is an explanatory diagram of the method for assembling the pet pen of an embodiment of the disclosure.
Figure 11:
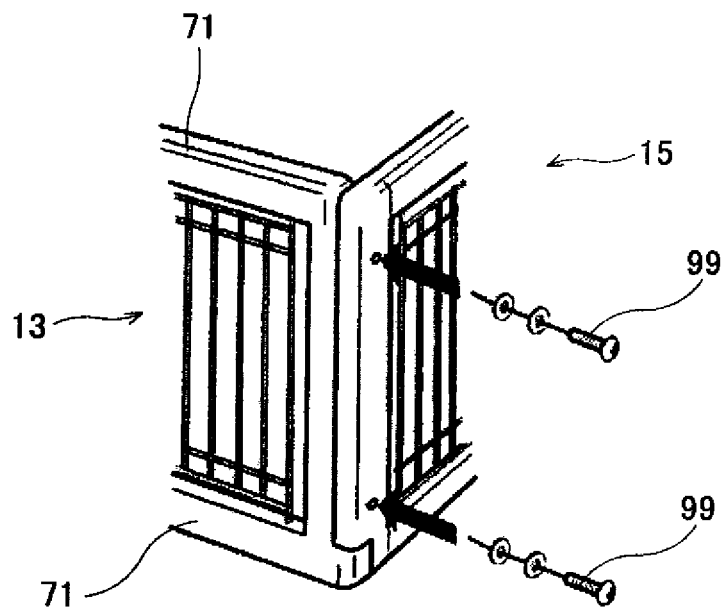
FIG. 11 is an explanatory diagram of the method for assembling the pet pen of an embodiment of the disclosure.

A method for connecting the panels described above to assemble a pen will be described. FIG. 10 and FIG. 11 are explanatory diagrams of a method for assembling the pen and show a method for joining the left side panel 13 and the first rear panel 15.

An extension portion 91 is formed at the lower end of the rectangular frame body 71 of the left side panel 13. On the other hand, an L-shaped cut portion 95 is formed at the lower end of the rectangular frame body 75 of the first rear panel 15 so as to engage with the extension portion 91, and a dowel hole 97 in which a dowel 93 fits is formed there. As shown in FIG. 10, both the left side panel 13 and the first rear panel 15 are arranged so as to be perpendicular, and the dowel 93 is inserted into the dowel hole 97. In addition, as shown in FIG. 11, by screwing fixing screws 99 into the frame of left side panel 13 from the frame of the first rear panel 15, both the first rear panel 15 and the left side panel 13 are fixed. The joining of the other panels is performed in the same manner.

Figure 12:
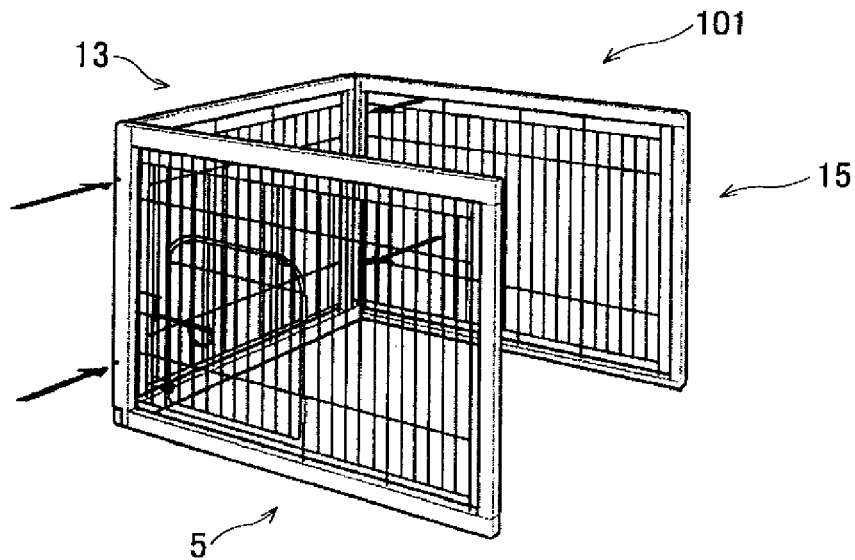
FIG. 12 is an explanatory diagram of the method for assembling the pet pen of an embodiment of the disclosure.

As shown in FIG. 12, using the method described above, the first front panel 5 and the first rear panel 15 are joined perpendicularly to both sides of the left side panel 13, and a first enclosure 101, which is U-shaped in the planar view, is formed.

Figure 13:
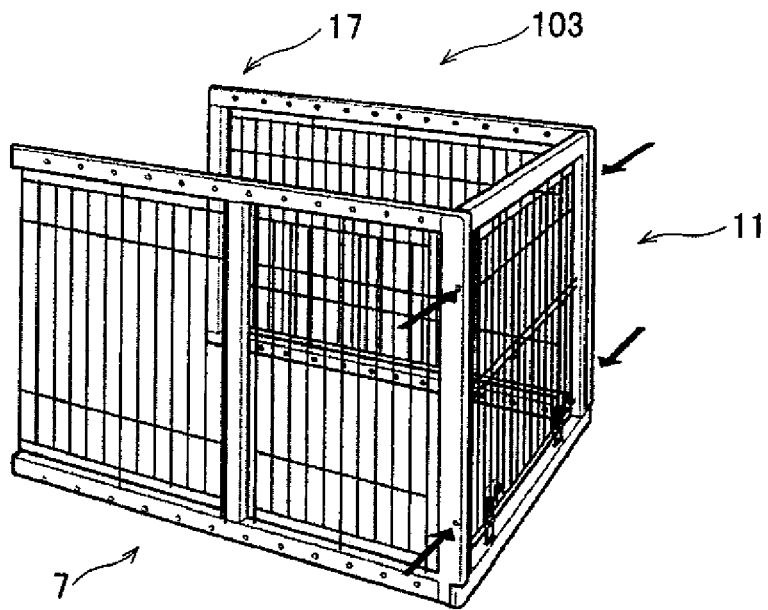
FIG. 13 is an explanatory diagram of the method for assembling the pet pen of an embodiment of the disclosure.

Also, as shown in FIG. 13, the second front panel 7 and the second rear panel 17 are joined at right angles with the sides of the right side panel 11, and a second enclosure 103, which is U-shaped in the planar view, is formed.

The opening side of the first enclosure 101 and the opening side of the second enclosure 103 are positioned to oppose each other. As shown in FIG. 1, formation of the pen is completed by connecting the panels using fixing screws such that a portion of the first front panel 5 and the second front panel 7 overlap, and a portion of the first rear panel 15 and the second rear panel 17 overlap. At this time, the width of the pen is adjusted by adjusting the length of the overlap portion.

Figure 14:
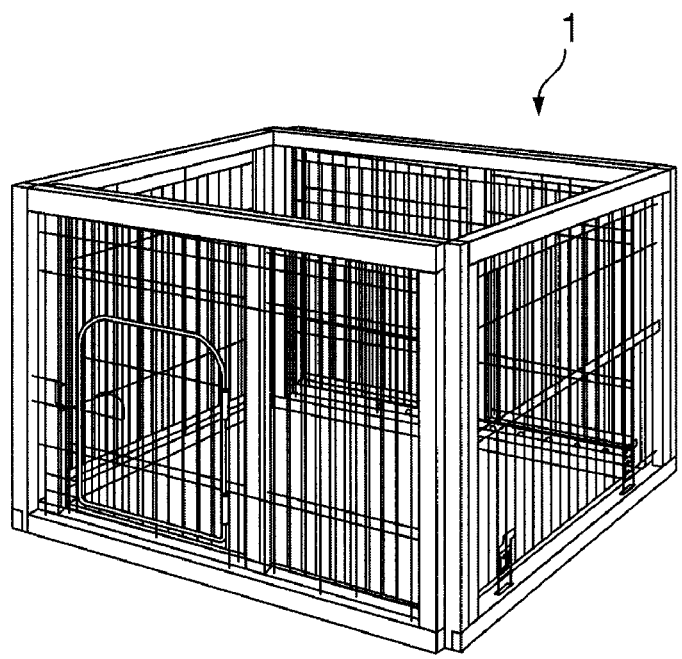
FIG. 14 is a perspective view of the state where the width of the pet pen of an embodiment of the disclosure is reduced to the smallest width.
Figure 15:
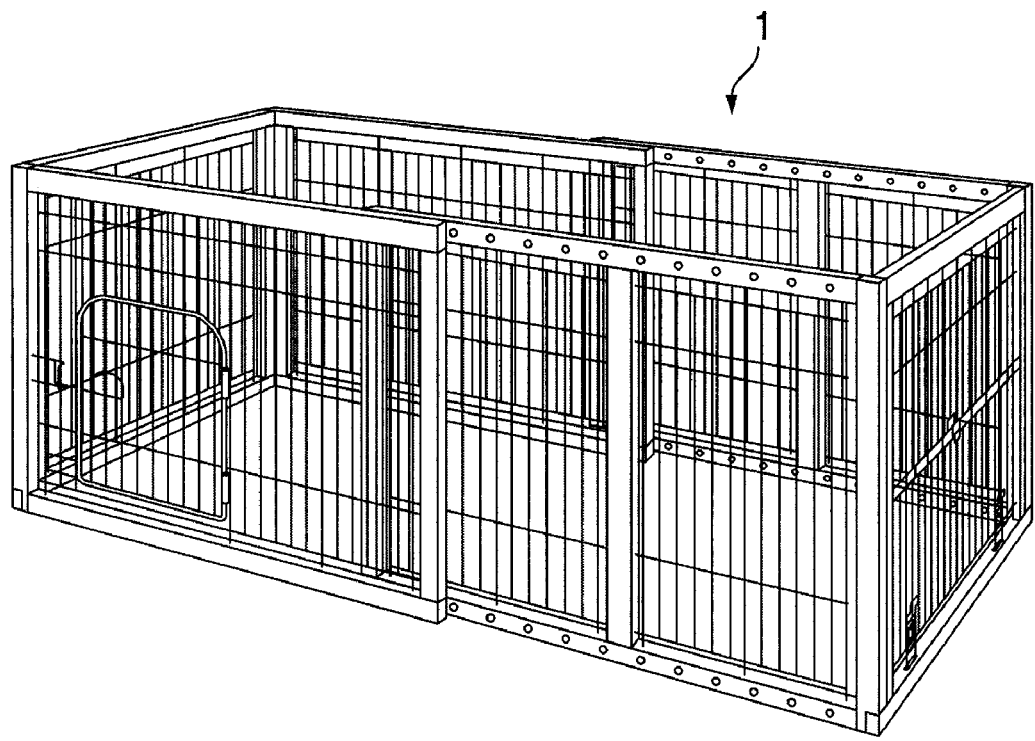
FIG. 15 is a perspective view of the state where the width of the pet pen of an embodiment of the disclosure is increased to the largest width.

FIG. 14 is a perspective view of the state where the width of the pet pen is reduced to its smallest width. FIG. 15 is a perspective view of the state where the width of the pet pen is increased to its largest width. As shown in FIG. 14, by arranging the left side of fence body 33 to be the rear of the first door 3 of the first front panel 5 rather than the frame middle vertical piece member 31 of the second front panel 7, when the first door 3 is opened, the fence body 33 of the second front panel 7 becomes an obstruction. Thus, when the pen width is made small in this manner, the fence body 33 is removed as shown in FIG. 3. As a result, the animals can be taken in and out of the pen without the fence body 33 becoming an obstruction when the first door 3 is opened.

Figure 16:
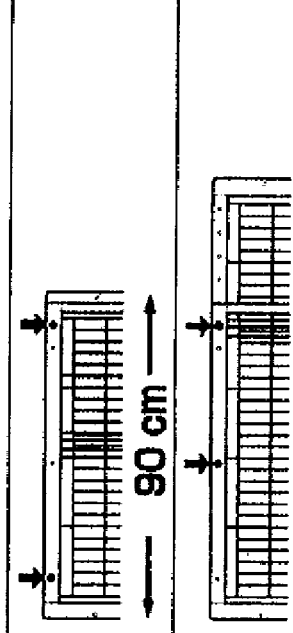
FIG. 16 is an explanatory diagram of the method for adjusting the width of the pet pen of an embodiment of the disclosure.

FIG. 16 is an explanatory diagram of the method for adjusting the width of the pet pen, and four aspects are shown in FIG. 16(*a*)-(*d*). FIG. 16 shows the state in which the upper portion of the first front panel 5 and the upper portion of the second front panel 7 are in the connected state when viewed from inside the pen. A connection hole is formed in the left and right end of the frame upper piece member 21 of the first front panel 5. Another connection hole is formed at a position that is separated by a distance that is the same as the amount of the increment between the connection holes formed in the second front panel 7, described hereinafter as adjacent to the connection hole at the right end of FIG. 16, which becomes the center portion in the assembled state. Furthermore, one connection hole is formed substantially in the middle of the frame upper piece member 21.

Meanwhile, the frame upper piece member 25 of the second front panel 7 has multiple connection holes at a fixed increment.

FIG. 16(*a*) shows the case where the width of the pet pen is smallest. In this case, as described above, the fence body 33 inside of the second front panel 7 is removed. In this case, as shown in the diagram 16(*a*) showing the connected state, the first front panel 5 and the second front panel 7 overlap, and fixing screws are inserted into the connection holes in both ends of both panels to thereby fix them. In the drawings, the positions for inserting the fixing screws are shown by arrows. In this example, the pen width is 90 cm.

FIG. 16(*b*) shows the case where the pen width is midway between the maximum and minimum. In this case, the first front panel 5 uses the right end and the middle connection hole, and the second front panel 7 uses the left end and the middle connection hole. In this example, the width of the pen is 122 cm.

It is noted that the width of the pen can be adjusted by the amount of the increment of the connection hole provided in the second front panel 7 from the state in 16 (*a*) to the state in 16(*b*). In this case, the same connection hole in FIG. 16(*b*) is used for the connection hole at the first front panel 5 side. On the other hand, at the second front panel 7 side, the right side hole that is used moves in order from the right end to the second hole, third hole, etc.

FIG. 16(*c*) shows the case where the pen width is to be increased by one increment more than that of FIG. 16(*b*). At this stage, the fence body 33 of the second front panel 7 that was removed is mounted. In addition, two right end connection holes are used at the first front panel 5, and the middle connection hole and the left adjacent connection hole are used at the second front panel 7. In this example, the width of the pen is 128.4 cm.

In the case where the width of the pen is to be increased more than that of the state in FIG. 16(*c*), the first front panel 5 uses two right end connection holes, and the second front panel 7 is gradually moved to the left side.

FIG. 16(*d*) shows the state where the pen width is at its largest. At this time, the first front panel 5 uses two right end connection holes, and the second front panel 7 uses two left end connection holes. In this example, the width of the pen is 154 cm.

As described above, the pen width can expand and contract in accordance with the amount of the increment of the connection holes provided in the second front panel 7. As such, the pet pen provides advantages not found in pet pens with fixed widths.

Accordingly, housing space can be suitably adjusted in accordance with the growth of the pet.

The pen can be used for any type of pet and, thus, can be used for a large dog as well as a small dog for example.

The width can be changed in accordance with the installation location. This allows freedom in selecting the location for installing the pet pen.

Because of the above advantages, the purchaser of the pen does not need to select a pen of a specific size while considering various conditions, as is the case with a pen that has a fixed width. Because the selection itself is complex, the embodiments in which the width is adjustable have the advantage that a complex decision process considering various conditions becomes unnecessary.

Figure 17:
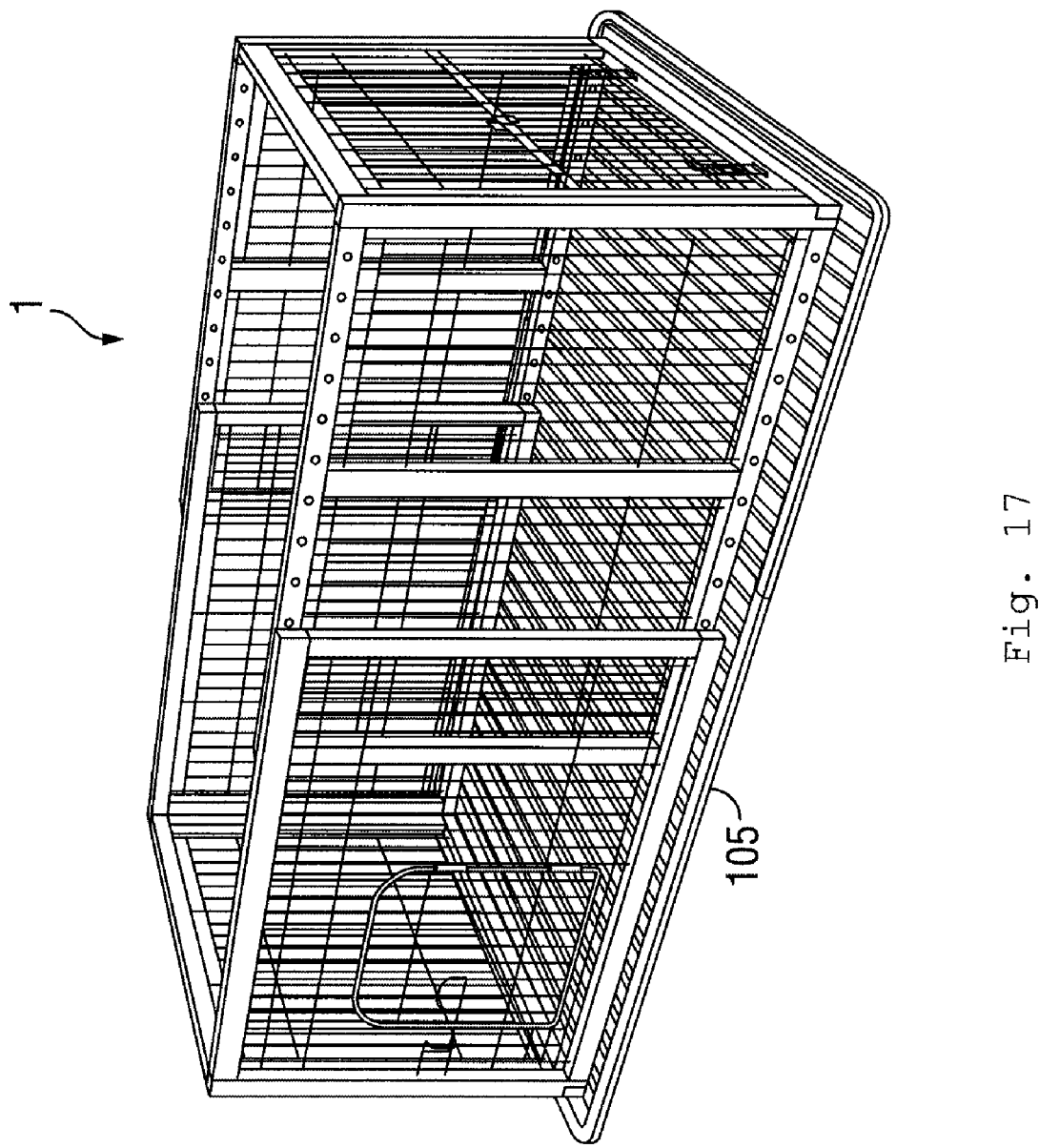
FIG. 17 shows the state in which the pet pen of an embodiment of the disclosure is installed on a tray.

It is noted that the pet pen 1 may be placed directly on the floor, but as shown in FIG. 17, a pen tray 105 may be placed on the floor in order to prevent the floor from becoming dirty, and then the pet pen placed thereon. The pen tray 105 may expand and contract to correspond with the expansion and contraction of the pen.

Figure 18:
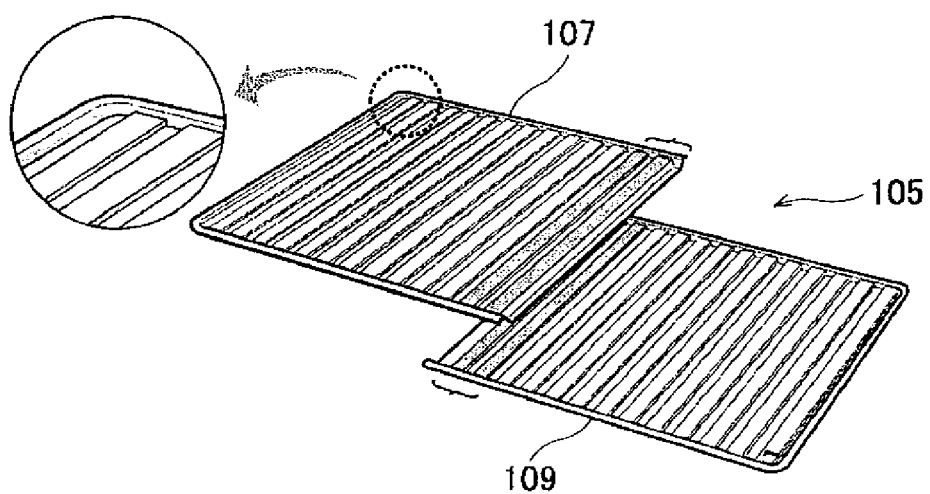
FIG. 18 is an explanatory view of the pen tray of an embodiment of the disclosure.
Figure 19:
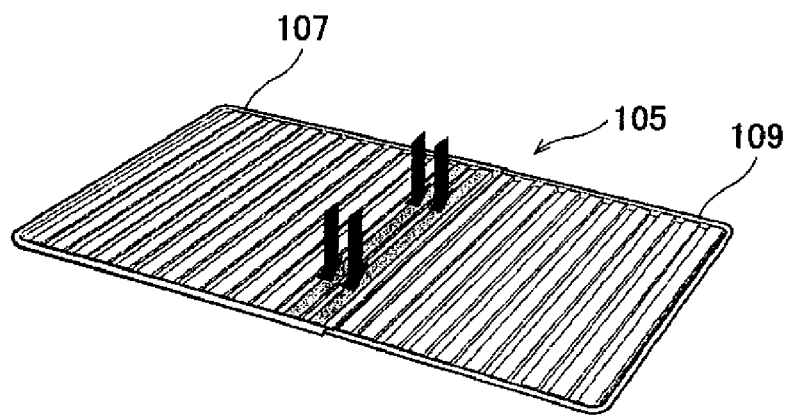
FIG. 19 is an explanatory view of the pen tray of an embodiment of the disclosure.

FIG. 18 and FIG. 19 are explanatory diagrams of the pen tray 105. As shown in FIG. 18, the pen tray 105 comprises two trays which are the upper tray 107 and the lower tray 109. The upper tray 107 and the lower tray 109 both have uneven portions 111 formed of rectangular hills and valleys. As shown in FIG. 19, a portion of the upper tray 107 and the lower tray 109 are overlapped and fit into the uneven portion 111 to thereby join both trays. The width of the trays is set by the length of the overlap.

Figure 20:
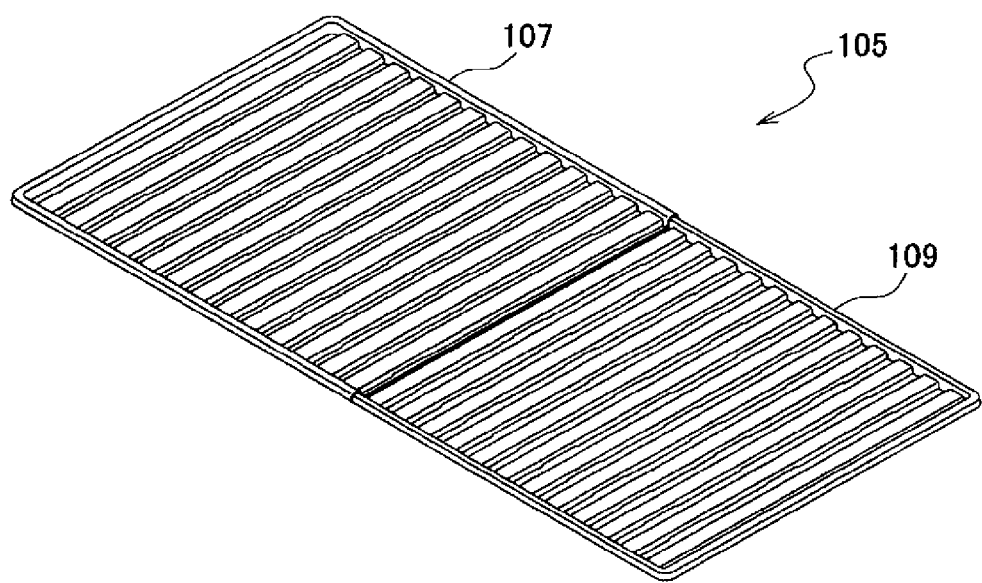
FIG. 20 is a perspective view of the state where the pen tray width of an embodiment of the disclosure is increased to the largest width.
Figure 21:
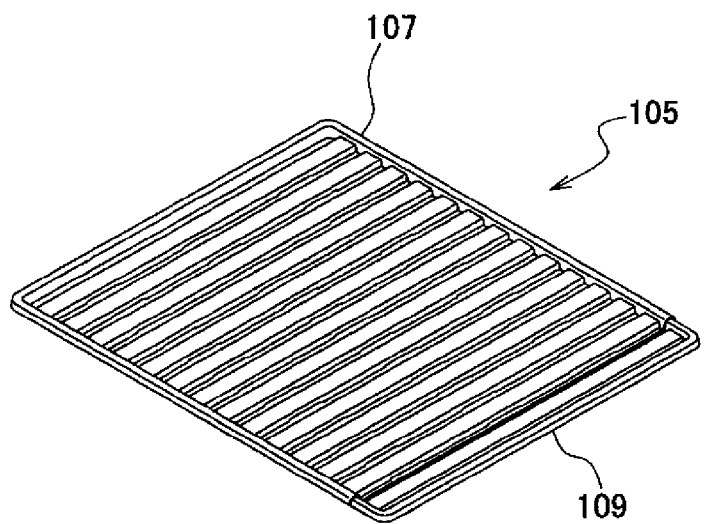
FIG. 21 is a perspective view of the state where the pen tray of an embodiment of the disclosure is decreased to the smallest width.

FIG. 20 is a perspective view of the state where the tray width is largest, while FIG. 21 is a perspective view of the state where the tray width is smallest.

Figure 22:
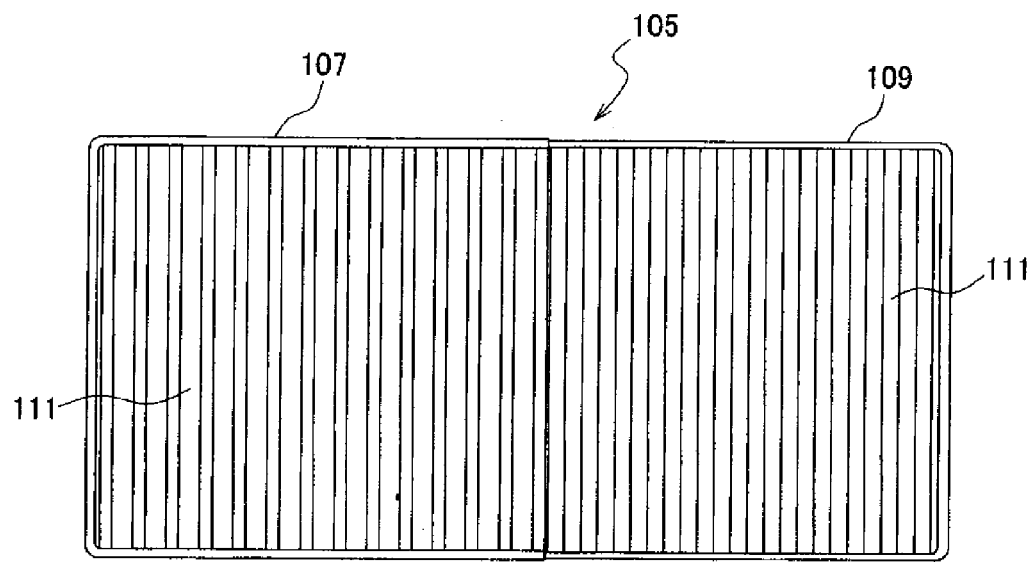
FIG. 22 is a plane view of the pen tray of an embodiment of the disclosure.
Figure 23:
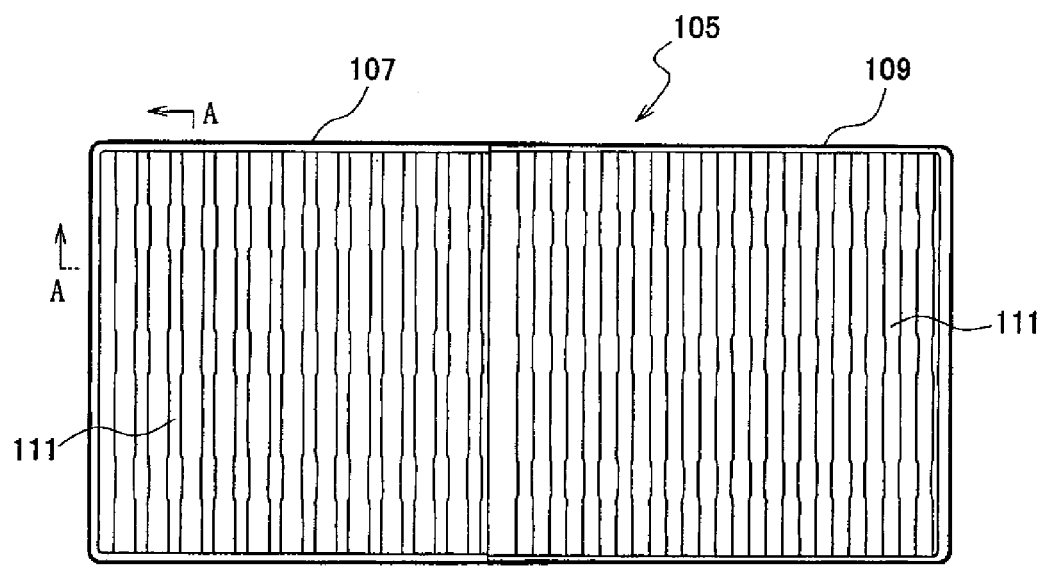
FIG. 23 is a bottom view of the pen tray of an embodiment of the disclosure.
Figure 24:
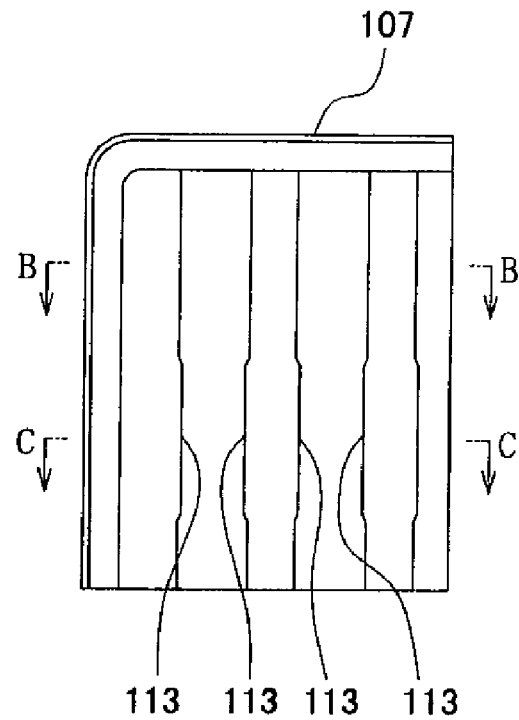
FIG. 24 is an enlarged view along arrow A-A of FIG. 23.
Figure 25:
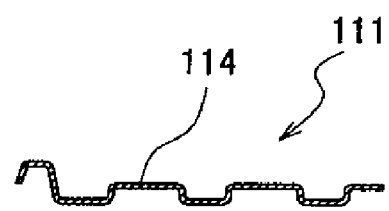
FIG. 25 is a cross-section along arrow B-B in FIG. 24.
Figure 26:
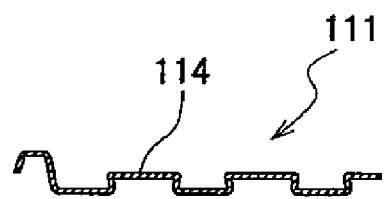
FIG. 26 is a cross-section along arrow C-C in FIG. 24.

FIG. 22 is a plane view of the state where the upper tray 107 and the lower tray 109 are assembled; FIG. 23 is a bottom view; FIG. 24 is an enlarged view along arrow A-A of FIG. 23; FIG. 25 is a cross-section along arrow B-B in FIG. 24; and FIG. 26 is a cross-section along arrow C-C in FIG. 24.

The following is a description of the uneven portion based on FIG. 22-FIG. 26.

The uneven portions of the upper tray 107 and the lower tray 109 are formed so as to fit into each other when the upper tray 107 and the lower tray 109 overlap.

A portion in the axial direction of the uneven portion has a constricted portion 113 due to the side wall of the convex portion being introduced inside. This constricted portion 113 appears when the pen tray 105 is viewed from the bottom (See FIG. 23 and FIG. 24). FIG. 25 shows the section that does not have the constricted portion 113, while FIG. 26 shows the section that has the constricted portion 113. As shown in FIG. 25, in the portion that does not have the constricted portion 113, the side wall of the convex portion 114 is substantially vertical, but as shown in FIG. 26, in the portion that has the constricted portion 113, the side wall of the convex portion 114 inclines to the inside.

In this manner, by providing the uneven portion 111 with the constricted portion 113, when the uneven portions of the upper tray 107 and the lower tray 109 are fit together, the effect of firmly fixing the two trays is achieved. Because of this configuration, when an attempt is made to move the tray when cleaning the pen tray 105, easy separation of the upper tray 107 and the lower tray 109 can be prevented, and the spilling of urine and the like remaining in the cage can be prevented.

It is noted that the height of the uneven portion 111 is preferably about 7 mm-8 mm. When comfort of the pet is considered, the vertical interval of the uneven portions is preferably low, but a fixed height is required for establishing a firm connection of the upper tray 107 with the lower tray 109. Thus, the height is set in view of obtaining a balance between both factors.

In addition, the amount of the increment that the width direction of the uneven portion 111 is adjusted is preferably in accordance with the amount of the increment that the width direction of the pet pen 1 is adjusted. This type of configuration allows for easy adjustment of the pen width.

It is noted that in this embodiment, in the case where the door portion of the first front panel 5 and the second front panel 7 overlap to make width adjustment of the first front panel 5 and the second front panel 7 possible, the fence body 33 of the second front panel 7 is removed in order to open the first door 3 in the rear direction.

In the case where a portion of the first door 3 of the first front panel 5 overlaps with the second front panel 7, in addition to the method in which the overlap portion of the fence body 33 is removed, other methods for opening the first door 3 in the rear direction may be one in which the overlap portion is mounted so as to be slidable and then slid in the horizontal direction, or a method in which a piece of the fence body 33 is rotated as the rotational axis.

Figure 27:
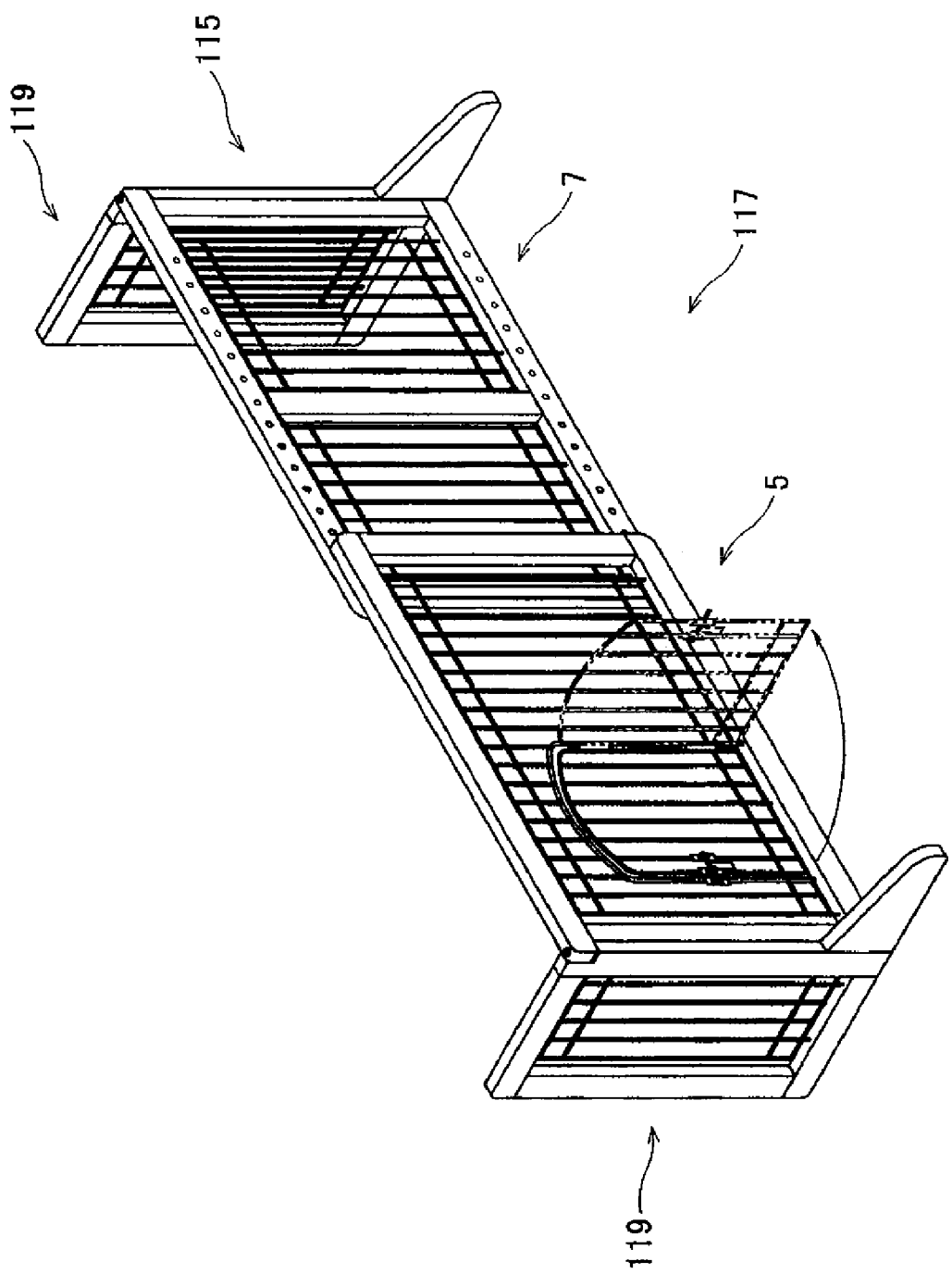
FIG. 27 is an explanatory drawing of another embodiment of the disclosure.

The panel body shown in FIG. 27 may be used as a pet restricting fence 115 in addition to being used as the pen front panel. The panel body is formed by the first front panel 5 and the second front panel 7 in which a portion of the two panels is overlapped. The width direction is made adjustable, and even in the state where the width is contracted, the opening of the door is not obstructed.

In the case where the animal is being kept indoors as shown in FIG. 27, the pet restricting fence 115 may be a fence for preventing passage of the pet into the kitchen, the house entrance area, or the like. Fence 115 comprises a front panel 117 formed from the first front panel 5 and the second front panel 7 and a pair of side panels 119 that are mounted so as to be foldable at and separable from the sides of the front panel 117.

The structure of the first front panel 5 and the second front panel 7 is the same as that shown in the embodiment above. In addition, even in the state where the width is contracted, the structure in which opening of the door is not obstructed may be the structure shown in the embodiment, or may be a modified example in which a sliding system or a rotation system is used.

In addition, the panel body may be used for the mount type pet restricting fence 115 or for a pet restricting fence without side panels in which both sides project to and hold the walls.

Figure 28:
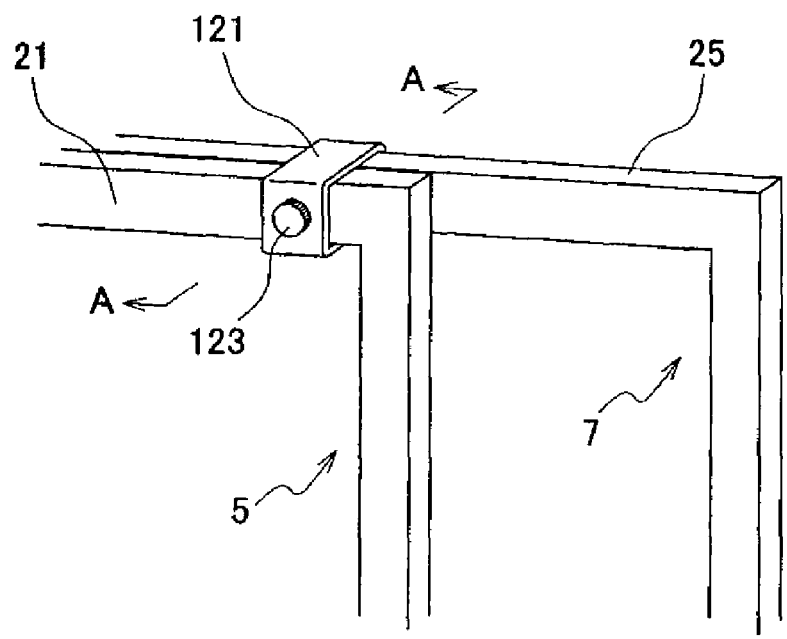
FIG. 28 is an explanatory drawing of another embodiment of the disclosure.
Figure 29:
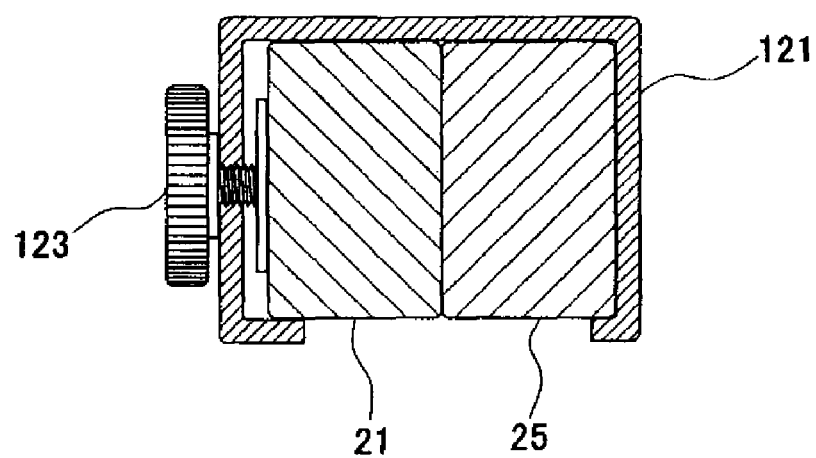
FIG. 29 is an explanatory drawing of another embodiment of the disclosure.

It is noted that the panels are installed to be adjustable in the width direction. For example, the method for joining the first front panel 5 and the second front panel 7 was described in which connection holes provided in the first front panel 5 and the second front panel 7 were connected with a fixing screw. However, other methods for fixing the panel may be used. For example, as shown in FIG. 28 and FIG. 29, which is a cross-section along arrow A-A in FIG. 28, a fixing member 121 with a substantially U-shaped cross-section is installed on the frame upper piece member 21 of the first front panel 5 and the frame upper piece member 25 of the second front panel 7 so as to enclose both frame upper piece members 21 and 25. Fixing may be done by pressing the frame upper piece member 21 to the frame upper piece member 25 using the fixing screw 123 provided at the side portion of the fixing member 121.

This configuration allows for continuous adjustment in the width direction.

Figure 30:
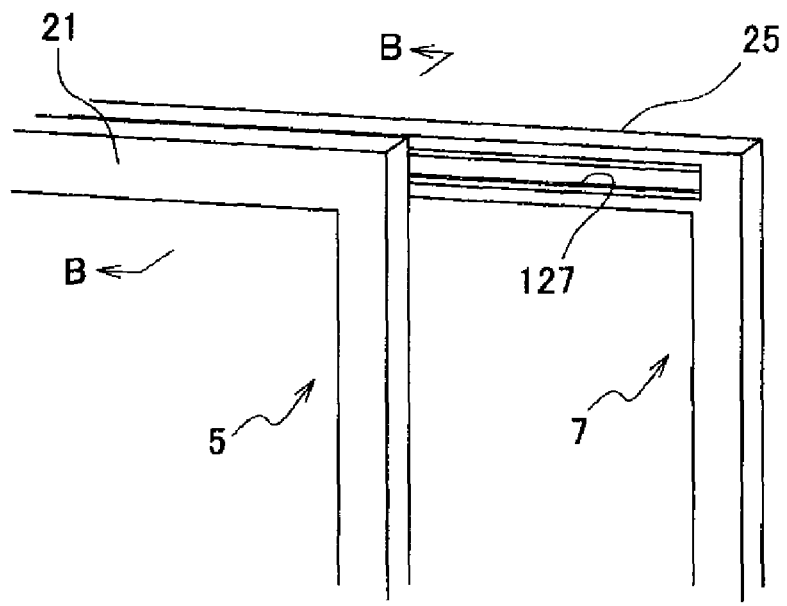
FIG. 30 is an explanatory drawing of another embodiment of the disclosure.
Figure 31:
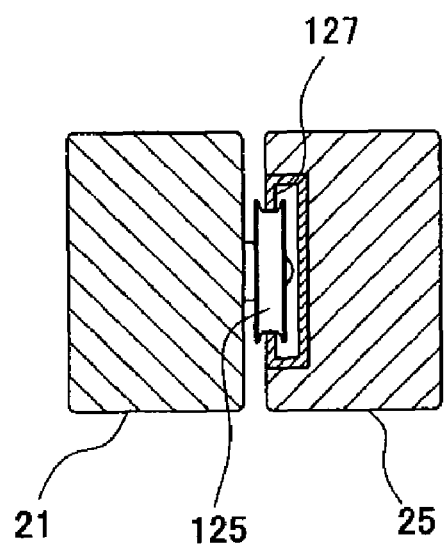
FIG. 31 is an explanatory drawing of another embodiment of the disclosure.

In addition, as shown in FIG. 30 and FIG. 31, which is a cross-section along arrow B-B in FIG. 30, wheels 125 with a groove are provided on a surface opposing the second front panel 7 on the frame upper piece member 21 of the first front panel 5, and a rail 127 that can be inserted into the grooves of the wheels 125 is provided on the frame upper piece member 25 of the second front panel 7. The first front panel 5 and the second front panel 7 may then be connected by fitting the grooves of the wheels 125 into the rail 127. In this case, smooth movement of the first front panel 5 and the second front panel 7 in the width direction is obtained. It is noted that the method for fixing at a prescribed position in the width direction may be the method shown in FIG. 28.

In addition, in the embodiments above, a method for allowing the first door 3 that is provided on the first front panel 5 to function effectively when the width of the pet pen 1 is contracted is shown earlier by the example in which the fence body 33 of the second front panel 7 is removed.

Figure 32:
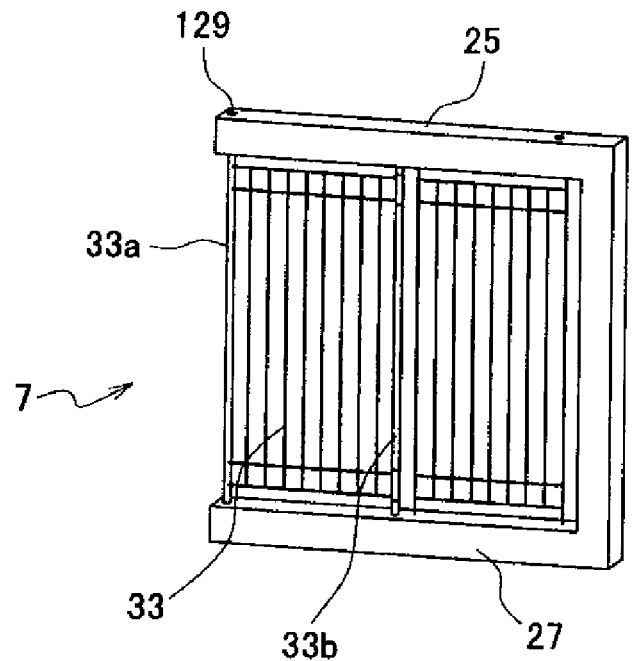
FIG. 32 is an explanatory drawing of another embodiment of the disclosure.
Figure 33:
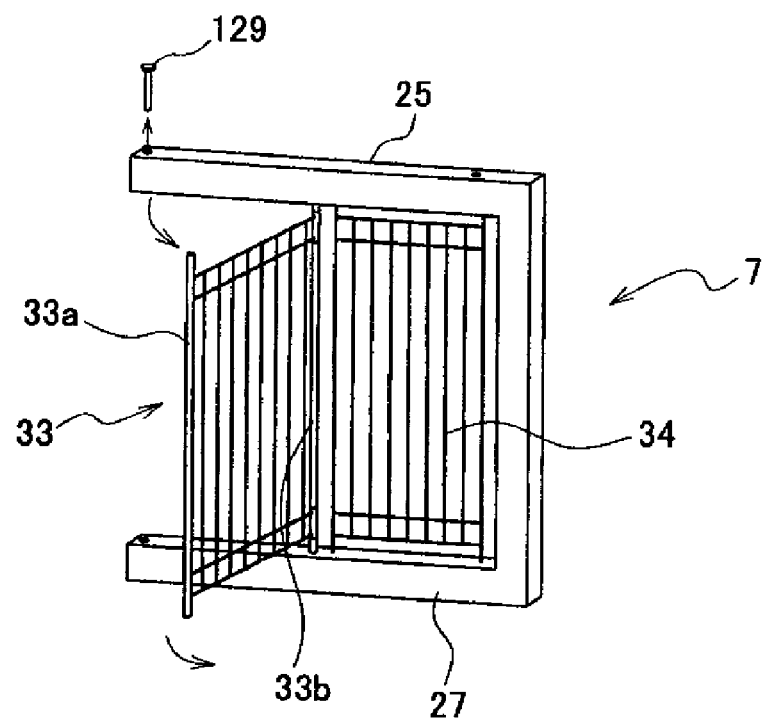
FIG. 33 is an explanatory drawing of another embodiment of the disclosure.
Figure 34:
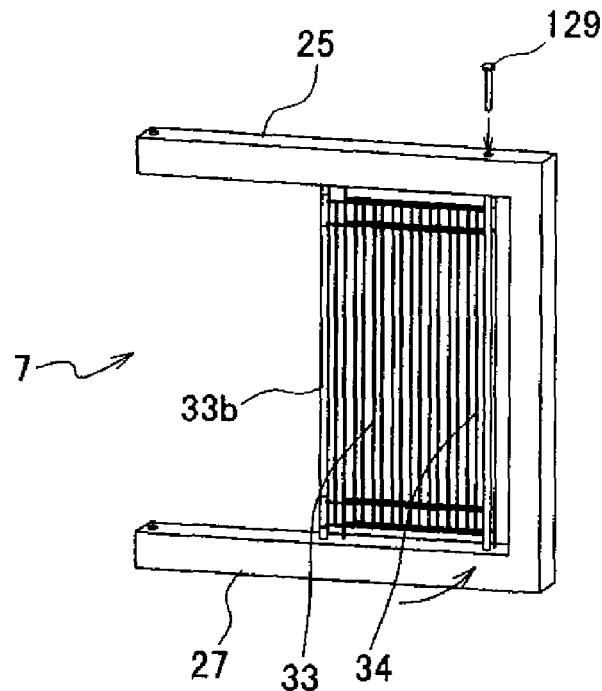
FIG. 34 is an explanatory drawing of another embodiment of the disclosure.

However, the present disclosure is not limited to this example. As shown in FIG. 32 for example, the configuration may be such that one vertical piece 33a is fixed by the pin 129 and mounted to the frame body so as to be rotatable with the other vertical piece 33b as the rotational axis. When the pen width is in a contracted state as shown in FIG. 33, the pin 129 is removed, and the fence body 33 is rotated. As shown in FIG. 34, when the vertical piece 33a is made to overlap with the fence body 34, which is adjacent to the fence body 33, it is fixed by the pin 129.

Figure 35:
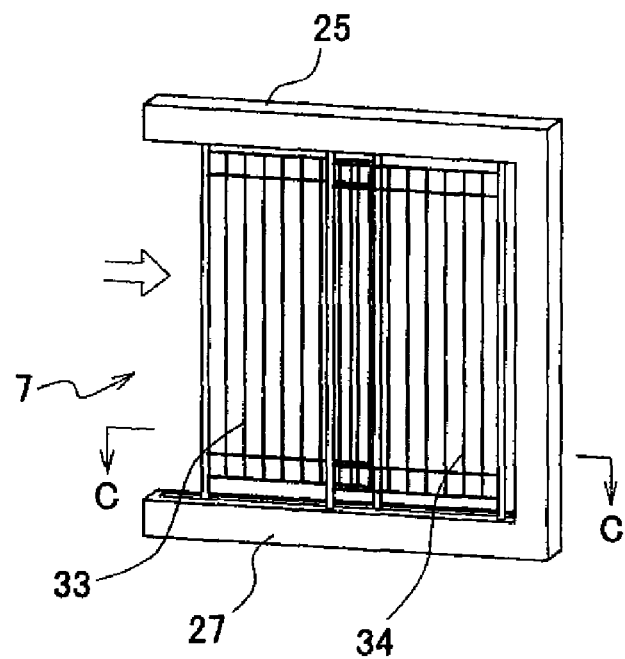
FIG. 35 is an explanatory drawing of another embodiment of the disclosure.
Figure 36:
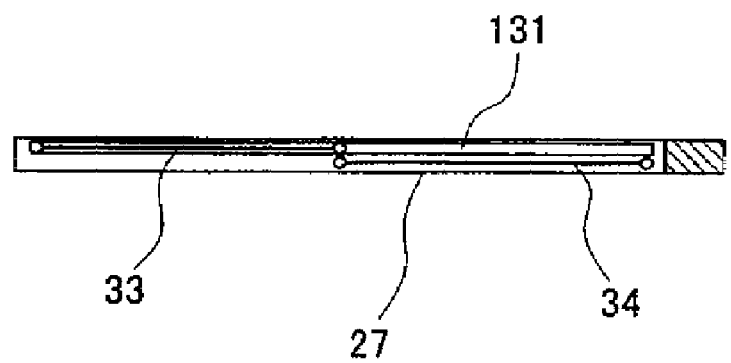
FIG. 36 is an explanatory drawing of another embodiment of the disclosure.

In addition, as shown in FIG. 35 and FIG. 36, which is a cross-section along arrow C-C in FIG. 35, the fence body 33 is provided so that it can slide on the frame upper piece member 25 of the second front panel 7 and on the slide groove 131 provided in the frame lower piece member 27. In the state where the width of the pen is contracted, the fence body 33 may then be slid to the frame body 34 side.

Figure 37:
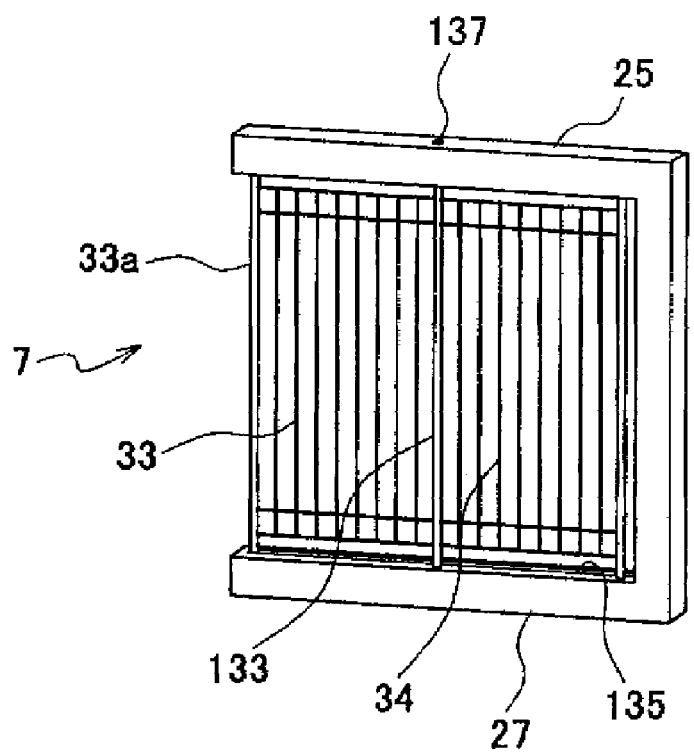
FIG. 37 is an explanatory drawing of another embodiment of the disclosure.
Figure 38:
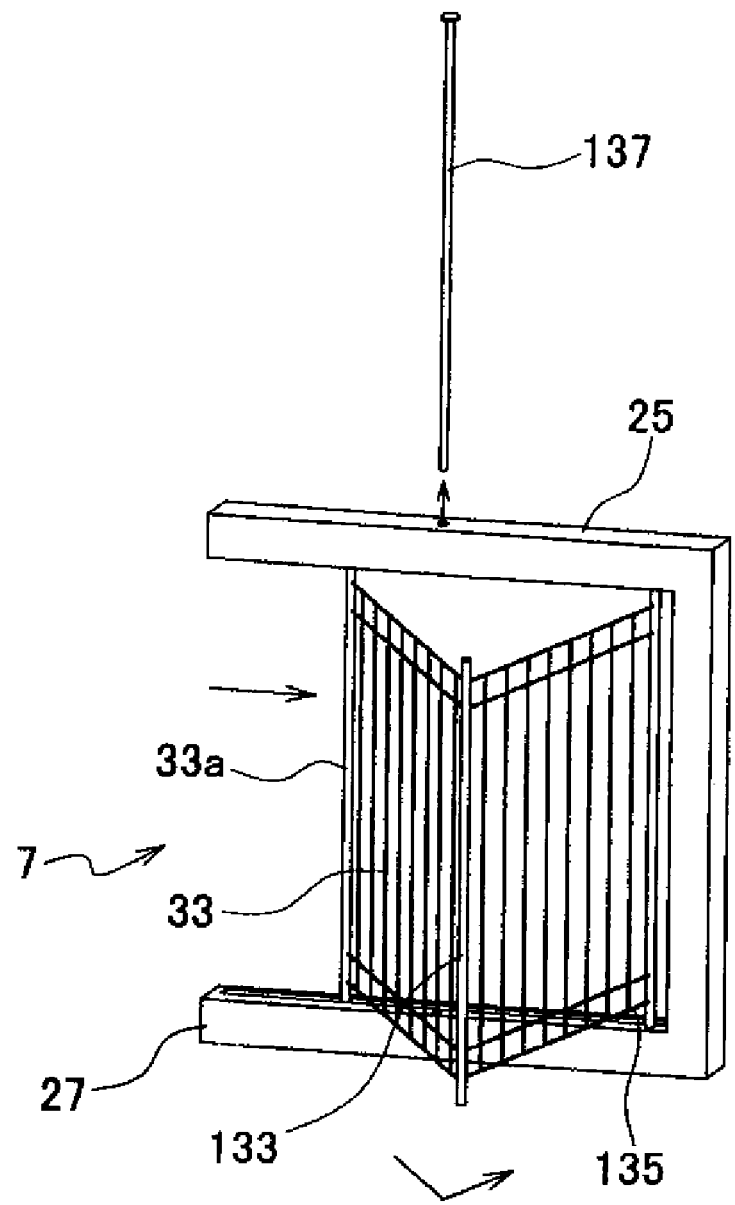
FIG. 38 is an explanatory drawing of another embodiment of the disclosure.

In addition, as shown in FIG. 37 and FIG. 38, another example may be one in which the fence body 33 and the fence body 34 are connected so as to be foldable via a connecting rod 133. A groove 135 in which the vertical piece 33a of the fence body 33 is movable to the fence body 34 side is provided on the frame upper piece member 25 and the frame lower piece member 27. In the state where the pen width is contracted as shown in FIG. 38, the fixing pin 137 of the connecting rod 133 is removed. The upper and lower pieces of the fence body 33 are then moved inside the groove 135 and folded and fixed once again using the fixing pin 137 in the folded state.

While several embodiments have been provided in the disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A pet pen for housing a pet, comprising:
a plurality of enclosing members that each have a wall body and an opening end, wherein the plurality of enclosing members form the pen by overlapping a portion of the wall body at two or more of the opening ends, and wherein the pen width is adjustable in the width direction at prescribed increments;
a pen tray to be installed under the pen, wherein the pen tray is adjustable in the width direction at prescribed increments, and wherein at least some of the prescribed increments of the pen are the same as at least some of the prescribed increments of the pen tray;
a first door provided in a portion of the wall body of a first enclosing member of the plurality of enclosing members, wherein when a portion of the wall body of a second enclosing member of the plurality of enclosing members overlaps with and creates a blockage of the first door, the overlapping portion of the wall body of the second enclosing member is movable to remove the blockage such that the first door is not obstructed;
a second door provided in a portion of the wall body of a second enclosing member of the plurality of enclosing members, wherein the second door rotates about a horizontal axis, and wherein the second door opens by rotating upward about the horizontal axis; and
a lock mechanism which is installed on the second door, wherein the lock mechanism functions as a lock when the second door is in a closed state, and when the second door is in an open state, the lock mechanism also functions to maintain the open state.

2. The pet pen of claim 1, wherein the lock mechanism comprises:
a first anchor portion which anchors the second door in the closed state to a frame of the second enclosing member; and
a second anchor portion which anchors the second door in the open state to the frame or the wall body of the second enclosing member;
wherein when the second door is closed, the first anchor portion is anchored to the frame and functions as a closed door lock mechanism when the second door is closed; and
wherein when the second door is open, the second anchor portion is anchored to the frame or wall body with the second door in the open state and functions as an open door lock mechanism which keeps the second door open.

3. The pet pen of claim 1, wherein the pen tray is formed of a plurality of plate materials that each have uneven portions formed of hills and valleys, wherein two or more of the plurality of plate materials are overlapped and caused to connect such that at least one of the hills of one of the two or more of the plurality of plate materials fits into at least one of the hills of another of the two or more of the plurality of plate materials, and wherein the hills and valleys enable adjustment at the prescribed increments.

4. The pet pen of claim 1, wherein the overlapping portion of the wall body of the second enclosing member is movable to remove the blockage by an action selected from the group consisting of sliding, rotating, folding, and withdrawing the overlapping portion of the wall body of the second enclosing member.

* * * * *